(12) United States Patent
Roberts

(10) Patent No.: US 6,176,664 B1
(45) Date of Patent: Jan. 23, 2001

(54) FASTENING SCREW AND METHOD OF FORMING SAME

(75) Inventor: David James Alexander Roberts, Mornington (AU)

(73) Assignee: W A Deutsher Pty Ltd, Victoria (AU)

( * ) Notice: Under 35 U.S.C. 154(b), the term of this patent shall be extended for 0 days.

(21) Appl. No.: 09/196,343

(22) Filed: Nov. 19, 1998

(30) Foreign Application Priority Data

Nov. 20, 1997 (AU) .................................................... PP0476

(51) Int. Cl.⁷ .................................................... F16B 25/00
(52) U.S. Cl. .................................... 411/387.1; 411/387.8; 411/417
(58) Field of Search ...................... 411/386, 387.1–387.8, 411/417

(56) References Cited

U.S. PATENT DOCUMENTS

| | | | |
|---|---|---|---|
| 1,827,615 | * 10/1931 | Rosenberg | ............................ 411/386 |
| 3,125,923 | * 3/1964 | Hanneman | ........................ 411/387.8 |
| 3,221,588 | 12/1965 | Wieber . | |
| 3,865,006 | 2/1975 | Massoney . | |
| 3,882,756 | 5/1975 | Sauer et al. . | |
| 4,023,914 | 5/1977 | Holmes . | |
| 4,194,430 | 3/1980 | Muenchinger . | |
| 4,439,077 | 3/1984 | Godsted . | |
| 4,477,217 | 10/1984 | Bonacorsi . | |
| 4,630,984 | 12/1986 | Reinwall et al. . | |
| 4,673,323 | * 6/1987 | Russo | ................................. 411/387.4 |
| 4,693,654 | 9/1987 | Bettini . | |
| 4,697,969 | * 10/1987 | Sparkes | ............................. 411/387.7 |
| 4,749,322 | 6/1988 | Synator . | |
| 4,787,792 | * 11/1988 | Jesson | ............................... 411/387.7 |
| 4,900,208 | 2/1990 | Kaiser et al. . | |
| 5,100,274 | 3/1992 | Hasan et al. . | |
| 5,141,376 | 8/1992 | Williams et al. . | |
| 5,143,498 | 9/1992 | Whitman . | |
| 5,217,339 | 6/1993 | O'Connor et al. . | |
| 5,304,023 | 4/1994 | Toback et al. . | |
| 5,413,444 | 5/1995 | Thomas et al. . | |
| 5,599,149 | * 2/1997 | Clemente | ............................ 411/386 |

\* cited by examiner

*Primary Examiner*—Flemming Saether
(74) *Attorney, Agent, or Firm*—Lowe Hauptman Gilman & Berner, LLP

(57) ABSTRACT

A fastening screw having an elongate shank (1), and a drilling tip (2) and a head (3) provided at respective opposite ends of the shank (1). The drilling tip (2) has a cutting edge (5) for cutting through metal and a flute (6) extending longitudinally of the shank (1). A thread (8) is formed on the shank (1) and extends over a portion of the section of the shank (1) in which the flute (6) is formed. A method of forming a fastening screw from a screw preform (9), includes deforming the preform (9) to create a drilling tip (2) which has at least one cutting edge (5) and a flute (6), and applying a thread (8) to the shank (1) in the region in which the flute (6) is formed.

5 Claims, 3 Drawing Sheets

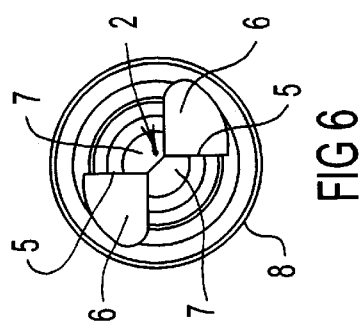
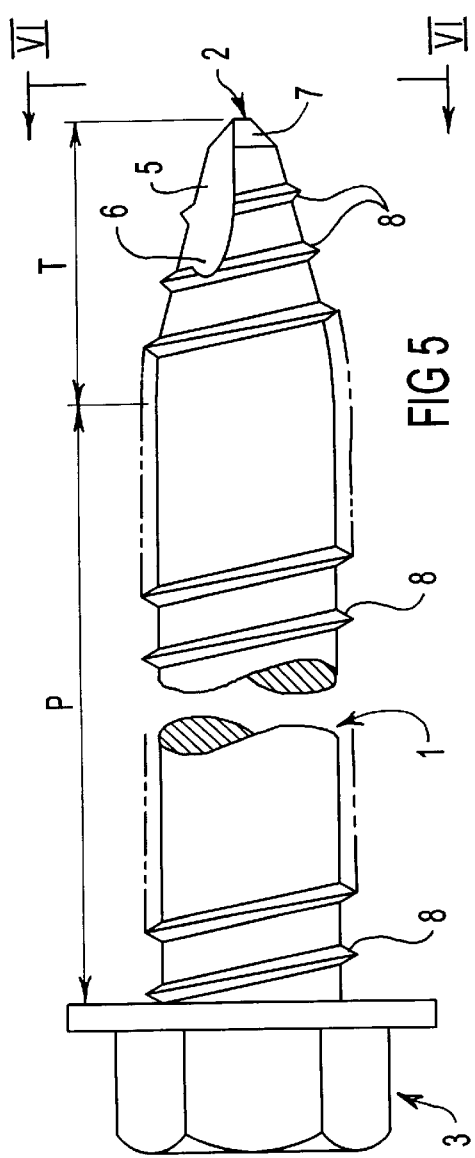
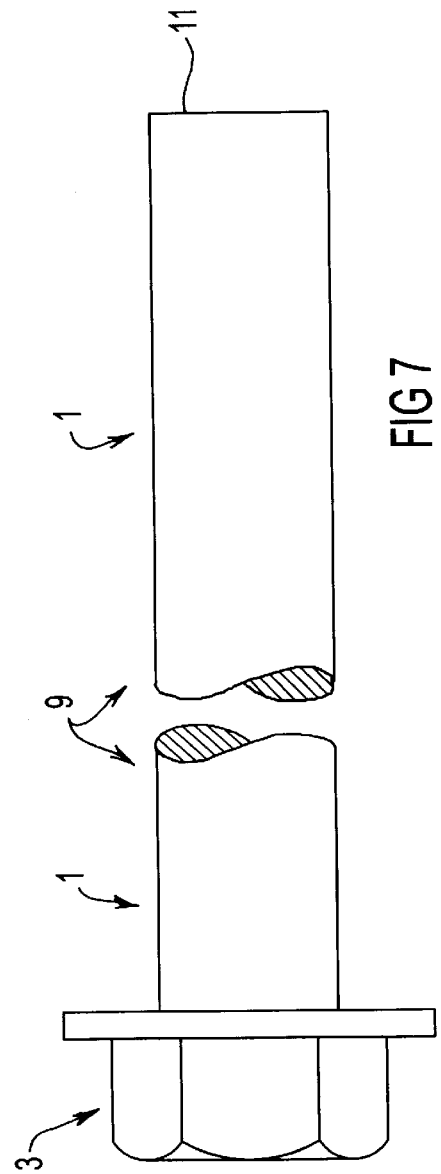

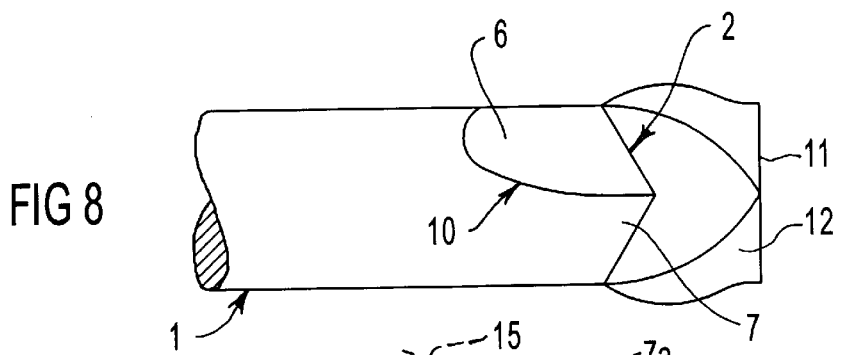
FIG 8
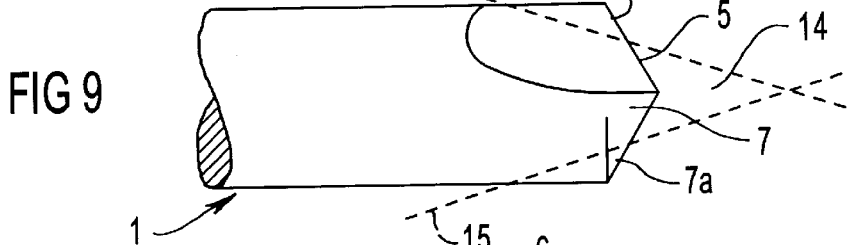
FIG 9
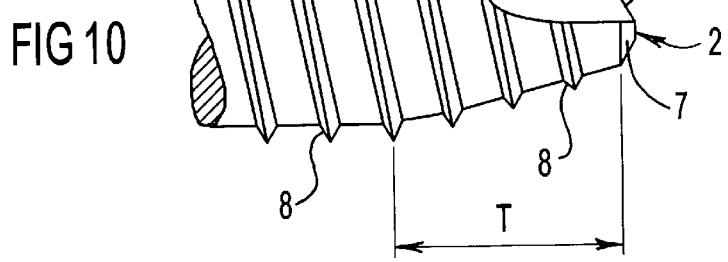
FIG 10
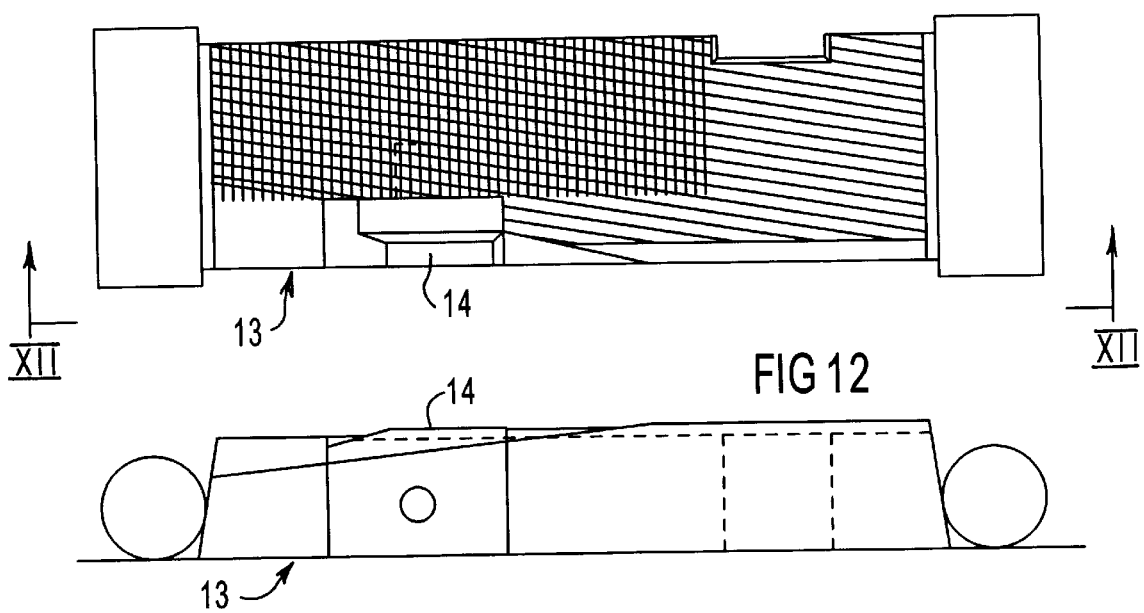
FIG 11
FIG 12

US 6,176,664 B1

FASTENING SCREW AND METHOD OF FORMING SAME

FIELD OF THE INVENTION

This invention relates to fastening screws of the self-drilling/self-tapping kind having a drilling tip at the terminal end of the threaded shank.

BACKGROUND OF THE INVENTION

Fastening screws of the foregoing kind are manufactured in a variety of forms, and it is generally the case that different forms are adopted for penetration into metal and timber respectively. Fastening screws intended to drill through sheet metal have a drilling tip which has substantially the same characteristics in terms of shape and function as the end of a conventional drill bit for drilling metal (see the attached FIGS. 1 and 2). The end portion of the fastening screw at which the drilling tip is formed is not threaded and is very much like a conventional drill bit except that the flutes are straight rather than helical. The length of the non-threaded end portion varies, but is generally significantly greater than the diameter of that portion.

A fastening screw intended for penetration into timber has an entirely different drilling tip, and a typical example is shown by the attached FIGS. 3 and 4. The major features of the wood screw is that it has a tapered end portion which terminates in a pointed terminal end, and the thread extends along that end portion substantially up to the terminal end or tip. Also, a single flute is provided in the drilling tip rather than two as in the case of a fastening screw intended to drill through sheet metal. Continuation of the thread through the tapered end portion is an important feature because it enables the thread to bite into the timber early in the penetration process and thereby pull the screw into the timber. That reaction between the thread and the timber assists the drilling operation by requiring minimum endwise pressure on the fastener.

A problem arises when a fastening screw designed to drill through metal is required to penetrate into timber, for example when the screw is being used to fasten a metal sheet to a timber support. Under those circumstances the screw typically penetrates both the metal sheet and the timber without difficulty until the threaded portion of the fastener shank reaches the timber surface. The thread does not bite into the timber as with the fastener of FIGS. 3 and 4, but tends to ride over the timber surface. Substantial endwise force is then required to drive the fastener further into the timber and achieve self-tapping without significant stripping of the internal thread so formed.

Because of the foregoing problem it is not uncommon for tradesmen to use fastening screws of the kind shown by FIGS. 3 and 4 for securing metal sheet to timber. Substantial endwise force is required to initiate penetration through the metal, but less effort is required for penetration and tapping into the timber for the reason previously stated. The drilling tip of such fasteners is not suited for cutting into metal and tends to leave a burr as the fastener penetrates through the metal sheet. Such burrs are unsightly and are dangerous because of their jagged nature. They also promote corrosion of the metal sheet and can tend to cause the roof to leak, because the sealing washer is prevented by such burrs from sitting firmly against the roof surface.

OBJECTS OF THE INVENTION

It is an object of the present invention to overcome or minimise the aforementioned difficulties by providing a fastening screw which cuts cleanly through metal and which requires minimum endwise force to form a mating thread within timber. It is another object of the invention to provide an improved method and apparatus for forming a fastening screw.

SUMMARY OF THE INVENTION

According to the present invention there is provided a fastening screw having an elongate shank, and a drilling tip and a head provided at respective opposite ends of said shank, said drilling tip having a cutting edge for cutting through metal and a flute extending longitudinally of said shank a thread being formed on said shank and extending over a portion of the section of the shank in which the flute is formed.

The drilling tip is designed to efficiently cut into metal and for collection and removal of swarf created during penetration of the drilling tip into a metal/timber component. The thread formed on the shank preferably extends over a substantial part of that portion of the shank in which said flute is formed. It is preferred that the fluted portion of the shank is tapered so as to be generally of frusto-conical form.

It is preferred that the drilling tip cutting edge extends outwards from the shank axis and angularly towards the head end of the shank, while the flute extends from the cutting edge towards the head end of the shank. The shank preferably has a parallel portion and a tapered portion which are adjacent the head and the drilling tip respectively of the fastener, the flute extends along at least part of the tapered portion, and a thread is formed on the shank so as to extend along both the parallel portion and the tapered portion of the shank.

The thread may not extend along the full length of either portion of the shank, but preferably extends along at least a substantial part of the tapered portion. It is further preferred that the thread extends without interruption across the junction between the two portions of the shank.

The drilling tip preferably includes two cutting edges and two flutes, each of which extends longitudinally from a respective one of the cutting edges. Each cutting edge may be located on a respective one of two opposite sides of the shank axis, and each may be arranged and angularly disposed in generally the same manner as the corresponding cutting edges of a conventional drill bit for drilling through metal.

According to another aspect of the invention there is provided a method of forming a fastening screw from a screw preform having a cylindrical elongate shank and a head at one end of the shank, including the steps of deforming said preform by means of a material displacement operation to create a drilling tip at an end portion of said shank opposite to said head, said drilling tip having at least one cutting edge for cutting through metal and a flute extending from said edge toward said head, applying a thread to said shank which extends over a portion of the section of the shank in which the flute is formed.

The end portion of the shank remote from the head may be subjected to a stamping, forging, or other material displacement operation to create a drilling tip configuration having at least one angularly disposed cutting edge and a flute extending from that cutting edge towards the head end of the shank. A portion of waste material may extend between the cutting edge and the terminal end of the preform shank, and that waste can be removed in any appropriate manner to leave the cutting edge exposed at a thereby newly created terminal end of the fastener. The thread may be formed on the shank after or during removal of the aforementioned waste material, and it is preferred that a thread rolling operation is used for that purpose.

The present invention further provides a die for forming a threaded fastening screw of the kind described above, from a screw preform having a cylindrical elongate shank and a head at one end of the shank, by a thread rolling operation, said die including a ramp surface for removing a portion of shank material from the terminal end of said shank opposite said head, to expose a cutting edge.

It is further preferred that each thread rolling die is formed so that a portion of the shank adjacent the drilling tip cutting edge is formed with a taper so as to reduce in diameter (or cross sectional size) in a direction away from the fastener head. That tapered portion includes at least part of the drilling tip flute. The thread preferably extends along at least a substantial part of the tapered portion so as to terminate close to the cutting edge of the drilling tip.

Formation of the tapered portion and/or the thread on that portion may result in removal of an outer portion of the drilling tip cutting edge as originally formed, but an inner portion (ie., adjacent the shank axis) of that cutting edge remains intact. Furthermore, formation of the tapered portion by plastic deformation of the shank displaces material such that there is axial elongation of the shank, and it is preferred that the tooling is constructed or arranged to allow that elongation to occur unimpeded so that the aforementioned inner portion of the cutting edge is not distorted.

It will be convenient to hereinafter describe the invention in greater detail by reference to the accompanying drawings which show one embodiment of the invention. The particularity of the drawings and the associated description is not to be understood as superseding the generality of the preceding broad description of the invention.

BRIEF DESCRIPTION OF THE DRAWINGS

In the drawings:

FIG. 5 shows a fastening screw according to one embodiment of the invention.

FIG. 6 is an end view in the direction VI—VI of fastening screw of FIG. 5.

FIGS. 7 to 10 diagrammatically illustrate method stages in the formation of a fastening screw according to one embodiment of the invention.

FIG. 11 shows a thread rolling die for use in the formation of a fastening screw according to FIGS. 7 to 10.

FIG. 12 is a cross-sectional view of the thread rolling die of FIG. 11 through XII—XII.

DESCRIPTION OF A PREFERRED EMBODIMENT

Figure 1:
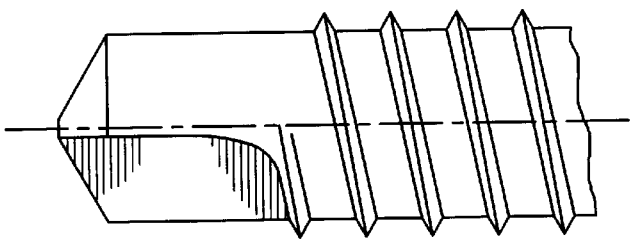
FIG. 1 is a side view of the drilling tip of a fastening screw according to the prior art.

FIGS. 5 and 6 show one form of fastening screw which incorporates an example embodiment of the invention. It is to be understood that the invention is applicable to fastening screws substantially different to the screw shown by FIGS. 5 and 6.

In the example shown, the fastener includes an elongate shank 1 and a drilling tip 2 and head 3 located at respective opposite ends of the shank 1. The shank 1 includes a parallel portion P and a tapered portion T arranged end to end as shown. The tapered portion T reduces in diameter in a direction away from the fastener head 3, and may have a length selected to suit the intended circumstances of use of the fastener. The degree of taper may be large or small according to requirements, but in any event it is such that the tapered portion T is frusto-conical. It is to be understood that the tapered portion T may be omitted in other embodiments of the invention.

The drilling tip 2 is formed at the terminal end portion of the shank 1, and in the example shown includes two cutting edges 5 which are located on respective opposite sides of the shank axis. Each cutting edge 5 extends angularly outwards from the shank axis so as to slope towards the fastener head 3. The angle of slope of each edge 5 may be substantially the same as that adopted for the corresponding edges at the cutting end of a conventional drill bit of the kind designed to cut through metal. Each cutting edge 5 is created by forming a flute 6 through the sloping end surface 7 of the shank 1. As will be apparent from FIG. 5, each flute 6 extends from the respective cutting edge 5 in the general direction of the longitudinal axis of the shank 1, and extends for at least part of the axial length of the tapered portion T.

It is preferred, as shown, that the end surface 7 of the shank 1 is immediately adjacent the small diameter end of the tapered portion T.

A thread 8 is formed on the shank 1 and extends along at least part of the length of each of the shank portions P and T. The thread 8 preferably extends over a substantial part of the tapered portion T so as to terminate adjacent the end surface 7. It is also preferred that the depth of the thread 8 progressively reduces adjacent the end surface 7 so as to provide a lead for thread tapping purposes.

Any suitable method may be adopted to produce a fastener of the kind described above. FIGS. 7 to 10 diagrammatically illustrate various stages in the formation of the fastener by one example method.

FIG. 7 illustrates a fastener preform 9 having an elongate cylindrical shank 1 and a head 3 at one end of the shank 1. A drilling tip configuration 10 (FIG. 8) is formed in the shank 1 adjacent the terminal end 11, preferably by means of a stamping, forging, or other metal displacement process. The configuration 10 is such that each of the cutting edges 5 is created, as is each associated flute 6 and the sloping end surface 7 through which the flutes 6 extend. A portion of waste material 12 exists to the right of the surface 7 as shown by FIG. 8, and that portion 12 can be removed in any suitable manner to leave the surface 7 and the edges 5 exposed at the newly created terminal end of the shank 1 as shown by FIG. 9.

The thread 8 may be formed on the shank 1 by any suitable means, but it is preferred to use a thread rolling process. A thread rolling die 13 as shown by FIGS. 11 and 12 may be used for that purpose.

Thread rolling is a well known process and does not need detailed explanation in this specification. In a preferred form of the method however, the die 13 is arranged to create special characteristics of the fastener as hereinafter explained. The die 13 may include a ramp 14 which operates to remove the waste portion 12 in a known manner during or before commencement of the thread forming operation.

In addition to thread formation, the die 13 is preferably constructed to create the tapered portion T by plastic deformation of the preform shank 1. That deformation step may be performed coincident with or during the thread forming step, and it is preferred that the thread 8 extends along at least a substantial part of the tapered portion T as shown by FIG. 10.

Formation of the tapered portion T by plastic deformation naturally causes axial elongation of the shank 1, and it is necessary to ensure that such elongation does not result in total destruction of the basic configuration of the drilling tip 2 as created at the FIG. 9 stage. For that purpose it is preferred that the thread rolling die 13 is appropriately constructed and related to the axial length of the preform shank 1 to avoid distortion of at least part of the end surface 7 during the aforementioned shank elongation. In a preferred form of the method that is achieved by forming the die 13 so that a space 16 (FIG. 9) remains in advance of the surface 7 as elongation of the shank 1 occurs. The broken lines 15 shown in FIG. 9 represent the surface of the die 13 which produces the tapered shank portion T.

As will be apparent from FIG. 9, the particular method described results in destruction of a radially outer portion 7*a* of the surface 7 as formed at completion of the stage shown by FIG. 8. A corresponding portion of each cutting edge 5 will be also destroyed in the process. On the other hand, a radially inner portion of the surface 7, and a corresponding portion of each edge 5, remain intact at completion of the FIG. 10 stage. The remaining portion of each edge 5 is a functional cutting edge of the drilling tip of the finally formed fastener.

Figure 2:
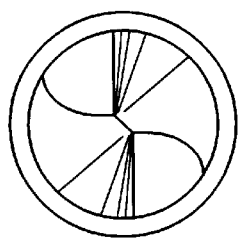
FIG. 2 is an end view in the direction II—II of the drilling tip of FIG. 1.
Figure 3:
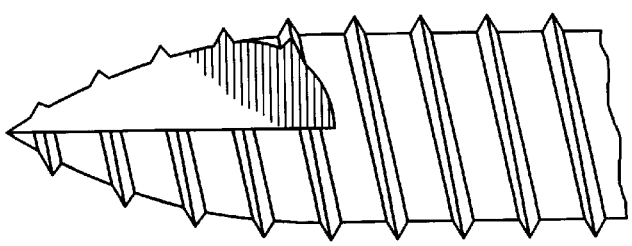
FIG. 3 is a side view of the drilling tip of a fastening screw according to the prior art.
Figure 4:
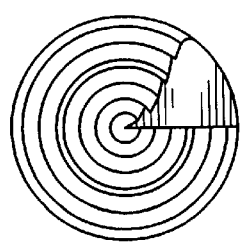
FIG. 4 is an end view of the direction IV—IV of the drilling tip of FIG. 1.

A fastener according to the invention has a drilling tip which is essentially a hybrid of the drilling tips of the two prior art fasteners of FIGS. 1 to 4. The new drilling tip retains desirable characteristics of each of the two prior art drilling tips. In particular, it is ideally suited for penetrating into either metal or timber because it retains the general characteristics of the drilling tip of FIGS. 1 and 2, and it enables the fastener to be driven into timber with minimum effort because of the tapered end portion and the provision of a thread along at least a substantial part of that tapered portion.

Other benefits of the new fastener will be readily apparent to persons skilled in the relevant art.

Finally, it is to be understood that various alterations, modifications and/or additions may be introduced into the constructions and arrangements of parts previously described without departing from the spirit or ambit of the invention.

What is claimed is:

1. A fastening screw for fastening metal sheet to timber comprising an elongate shank, and a drilling tip and a head provided at respective opposite ends of said shank, said shank tapering to said drilling tip, said drilling tip having a pair of cutting edges disposed on opposite sides of the longitudinal axis of said shank that define a functional cutting edge structured for cutting through metal sheet, and flutes respectively extending longitudinally of said shank from each of said cutting edges, a thread being formed on said shank and extending from adjacent said drilling tip rearwardly to beyond the section of the shank in which said flutes are formed, wherein the drilling tip terminates in a pair of sloping end surfaces intersecting each other at a tip end in the form of a linear intersection extending perpendicular to a longitudinal axis of the shank, each cutting edge of one flute terminating at a point at a lowermost extent thereof, said points establishing opposite ends of the linear intersection.

2. A fastening screw according to claim 1, wherein said thread extends along a substantial part of the length of the said tapered portion.

3. A fastening screw according to claim 1, wherein said thread extends across the junction between said parallel and tapered portions without interruption.

4. A fastening screw according to claim 1, wherein said thread reduces in depth toward the drilling tip end of said shank.

5. A fastening screw according to claim 1 and being formed by a stamping or forging process.

* * * * *